C. A. GILLINGHAM.
PROTECTING SEAL.
APPLICATION FILED APR. 27, 1914.
1,118,121.
Patented Nov. 24, 1914.
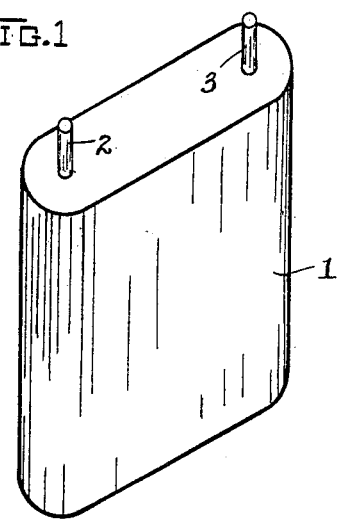
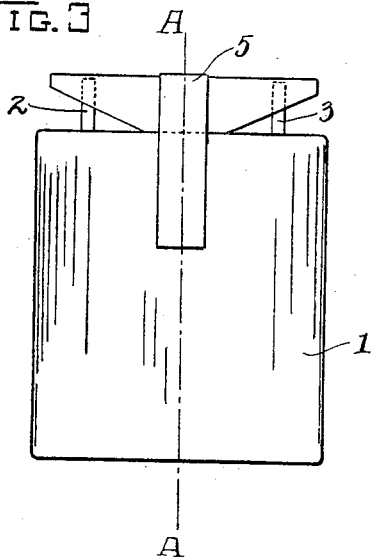
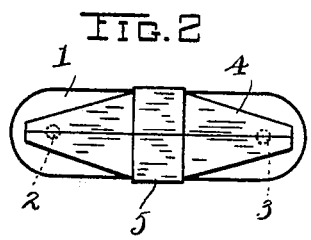
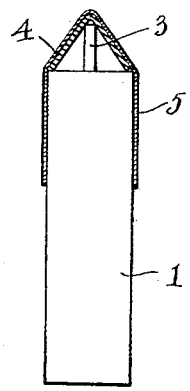
WITNESSES:
INVENTOR.
CHARLES A. GILLINGHAM
BY Ira J. Adams
ATTORNEY

UNITED STATES PATENT OFFICE.

CHARLES A. GILLINGHAM, OF LAKEWOOD, OHIO, ASSIGNOR TO NATIONAL CARBON COMPANY, A CORPORATION OF NEW JERSEY.

PROTECTING-SEAL.

1,118,121.  Specification of Letters Patent.  Patented Nov. 24, 1914.

Application filed April 27, 1914. Serial No. 834,562.

*To all whom it may concern:*

Be it known that I, CHARLES A. GILLINGHAM, a citizen of the United States, residing at Lakewood, in the county of Cuyahoga and State of Ohio, have invented a certain new and useful Improvement in Protecting-Seals, of which the following is a full, clear, and exact description.

This invention relates to improvements in protecting seals for dry batteries. Such seals are a protection for both the seller and user, and are constructed in such manner that the terminals are exposed to permit voltmeter or ammeter leads to contact therewith to determine the condition of the battery. It is necessary, nevertheless, to break the seal before the terminals or binding posts of the battery may be connected up in the manner in which they are intended to be used. By this arrangement, the purchaser may try the voltage of the battery to determine whether it is in good condition, before accepting, without tearing the seal. If the battery is old and has deteriorated through shelf life or other causes, it may be rejected by the customers without destroying the seal. However, upon breaking the seal, the purchaser forfeits the right to ask for replacement if unsatisfactory, which protects the dealer from fraudulent claims regarding the condition of the article when it was sold. The purchaser, by obtaining sealed batteries is also insured against obtaining used or partially used cells, so that a mutual benefit is derived.

My invention relates to an improved seal for accomplishing the results set forth.

My protective seal also serves to a large extent to prevent accidental short circuiting of the terminals of the battery before it is placed in use.

While the invention is illustrated in connection with a "midget" battery for earphone purposes and especially adapted therefor, it will be understood that it is applicable to other batteries having projecting terminals.

In the drawings: Figure 1 is a perspective view of an earphone dry battery without a seal. Fig. 2 is a top view of the battery with the seal applied thereto. Fig. 3 is a side view of the battery and seal. Fig. 4 is a partial cross section taken on the line A—A of Fig. 3.

The battery casing 1 containing a number of zinc-carbon dry cells has terminals such as the metal rods 2, 3 projecting from the top. These terminals are adapted to be readily fitted into a socket connected to the earphone. However, any type of binding posts or terminals might be used in connection with the seal as hereinafter described. The protecting seal consists of a piece of cardboard 4 scored and bent into an angular or trough form and open at both ends. The apex of the trough is adapted to cover the ends of the terminals 2, 3 and the sides are preferably of sufficient length to fit just flush with the sides of the battery casing when the apex rests on the terminals. The hood or trough is then sealed to the casing by means of a thin strip of adhesive paper 5 which is affixed at each end to the sides of said casing and also to the trough or hood. To make the terminals more readily accessible, each of the four corners of the cardboard cap 4 is cut off as shown in the drawings.

Referring to Fig. 3 it will be evident that the terminals 2, 3 are exposed so that the leads of an electric meter may be readily applied thereto, but in would be difficult to use the battery without removing the hood. When it is desired to put the battery into use, the thin paper strip 5 is readily broken by removing the hood which necessarily will tear the seal. After the seal is once broken, the battery cannot be returned and this condition of sale will be set forth in a printed notice upon the seal.

Having described my invention, what I claim is:

1. An electric battery, a projecting terminal, a trough shaped insulating member extending from said terminal, and resting on the top of the said battery and means to seal said member in position over the terminal whereby the battery cannot be used without breaking said sealing means.

2. An electric battery, rigid projecting terminals, a trough shaped covering inverted over said terminals and having its sides resting on the top of the battery, and means to seal the member in place whereby the battery can be tested but not put to its intended use without breaking the seal.

3. An electric battery, rigid terminals projecting from the top thereof, a trough shaped insulating covering inverted over the terminals with the bottom in engagement therewith and the sides resting on the top of the battery, and a strip passing over said member and secured to each end to the sides of the battery.

4. An electric battery, rigid terminals projecting from the top thereof, an open ended insulating trough inverted over said terminals and supported thereon, and its sloping sides resting on the top of the battery flush with the sides thereof, and a sealing strip passing over said member, and secured to the member and sides of the battery whereby the battery can be tested but cannot be put to its intended use without breaking the seal.

In testimony whereof, I hereunto affix my signature.

CHARLES A. GILLINGHAM.

Witnesses:
H. G. GROVER,
WALLACE W. MANN.